April 4, 1950           J. A. McLEAN           2,502,660

DEVICE FOR SCRIBING PIPES

Filed Jan. 24, 1949           2 Sheets-Sheet 1

INVENTOR
JOSEPH A. McLEAN
By: Fetherstonhaugh & Co.
ATT'YS

April 4, 1950  J. A. McLEAN  2,502,660
DEVICE FOR SCRIBING PIPES
Filed Jan. 24, 1949  2 Sheets-Sheet 2

INVENTOR
JOSEPH A. McLEAN
By: Fetherstonhaugh & Co.
ATT'YS

Patented Apr. 4, 1950

2,502,660

UNITED STATES PATENT OFFICE 2,502,660

DEVICE FOR SCRIBING PIPES

Joseph A. McLean, Raymond, Alberta, Canada

Application January 24, 1949, Serial No. 72,503

6 Claims. (Cl. 33—75)

This invention relates to a device for scribing pipes for angular cutting.

Pipe scribing devices have been known and have assumed many forms in the past. Some of them merely comprise a stencil and a means for strapping it around a pipe. Others of them are quite complex and include elaborate clamp and protractor means for controllably guiding a scriber around a pipe. These devices of the prior art are all subject to the disadvantage that they can only be used to scribe pipes of limited diameter and/or that they are too complicated in use and/or too costly to build. My invention overcomes these disadvantages.

It is then an object of this invention to provide a pipe scribing device that can be used on a wide range of pipe sizes.

It is a further object of the invention to provide a pipe scribing device that is simple to use.

It is a still further object of the invention to provide a pipe scribing device that is cheap to manufacture.

With these and other objects in view a scribing device according to my invention comprises two heads, each having a reference axis, and two blocks. One of the blocks is pivotally mounted in one of the heads with its pivotal axis at right angles to the reference axis thereof, and the other of the blocks is pivotally mounted in the other of the heads, with its pivotal axis at right angles to the reference axis thereof. The device also includes a flexible tape which is rigidly secured at one of its free ends to one of the pivotally mounted blocks, and which passes through a slot formed in the other of the blocks. The block to which the tape is rigidly secured is also slotted to frictionally receive the other free end of the tape. According to the invention means are also provided for mounting the two heads on the exterior wall of a pipe with their principal axes in parallel spaced apart relation to each other and to dispose the pivotal axis of each of the blocks carried thereby in alignment with each other. In use the tape is caused to extend from the block to which it is securely fastened, to pass through the slot in the other pivotally mounted block and to frictionally engage in a slot formed in the block to which it is rigidly secured. The tape thus extending between the pivotally mounted blocks to encircle the pipe is pulled taut to make a desired angle to the above-mentioned reference axis. The pipe is then scribed by drawing a scriber along the edge of the tape around the pipe. A protractor is preferably mounted on one of the heads to measure angles of inclination from the principal axis thereof. The invention will be clearly understood after reference to the following detailed specification read in conjunction with the drawings.

Figure 1:
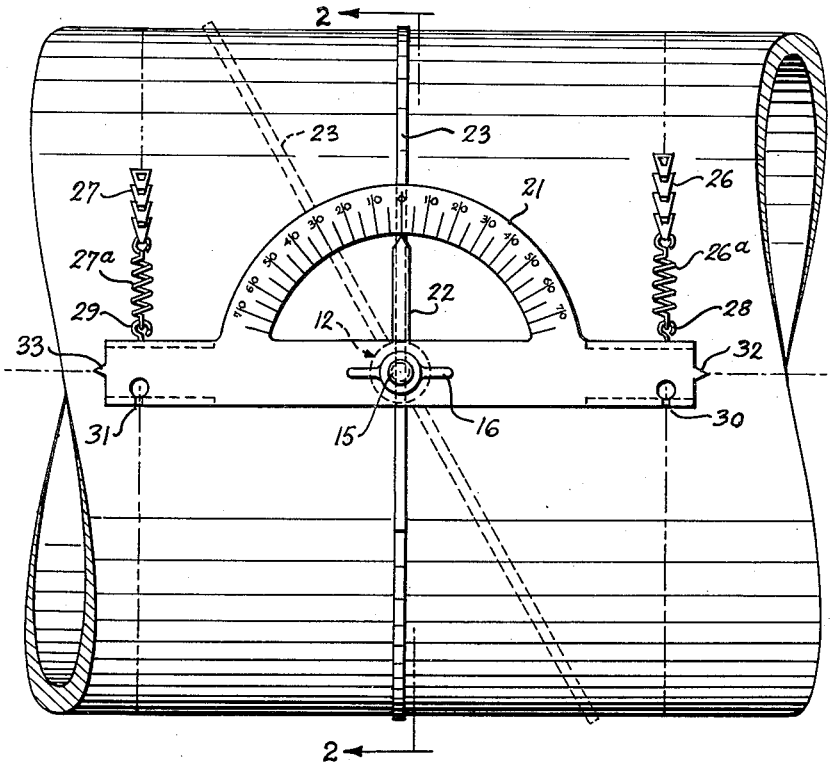
Figure 1 shows a section of pipe in side elevation with a pipe scribing device according to the present invention mounted thereon.

The embodiment of the invention shown in the drawings comprises two heads 10 and 11 which for the purposes of identification in this disclosure will be referred to as the front and back heads respectively. These heads are elongated in character, and in each case the longitudinal axis thereof, shown in dotted lines in Figures 1 and 4, serves as a reference axis. Blocks generally indicated by the numerals 12 and 13 are pivotally mounted in the heads 10 and 11 respectively with their pivotal axis perpendicular to the reference axis thereof. The block 12 will be seen to comprise a body portion 14 and a threaded stem 15 that is designed to extend through a suitable bore in the head 10. The centre of the bore that receives the stem 15 is, of course, located on the reference axis of the head 10. A wing nut 16 threadedly engages on the free end of the stem 15 and tightens against the head 10 to lock the block 12 in fixed relation thereto during use. A point 17 co-axially aligned with the pivotal axis of the head 12 extends from the bottom of the body 14 of the head 12. The use of this point will be apparent later. The body of the block 12 also carries a pointer 22 which is rigidly secured thereto by welding or any other suitable means.

The block 13 mounted in the back head 11 is somewhat similar to the block 12 in construction. It also has a body portion 18 and a headed stem 19 that extends through a suitable bore formed along the reference axis of the head 11. The block 13 also has a point 20 extending therefrom co-axially aligned with its pivotal axis.

Figure 2:
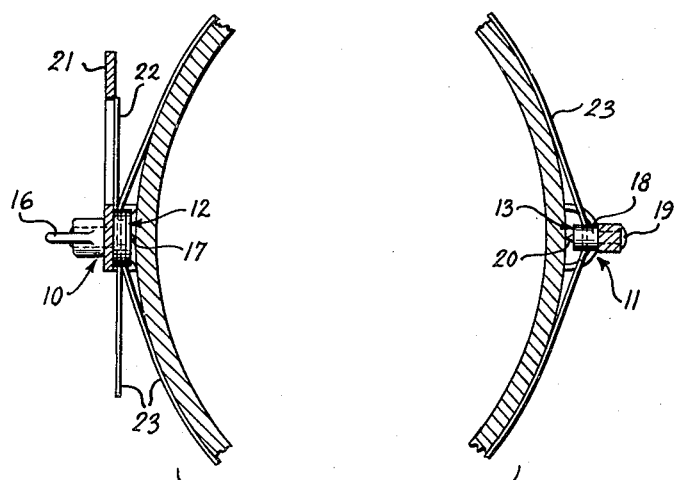
Figure 2 is a cross sectional view taken along the line 2—2 of Figure 1 but broken to save drafting space.
Figure 3:
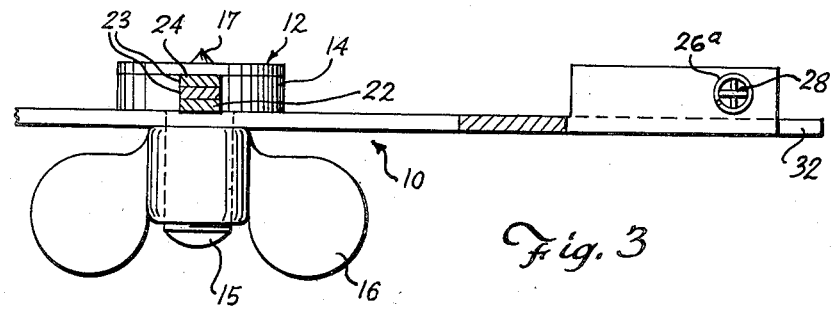
Figure 3 is a detailed plan view showing one of the blocks and the manner in which it is pivotally mounted within a head.
Figure 4:
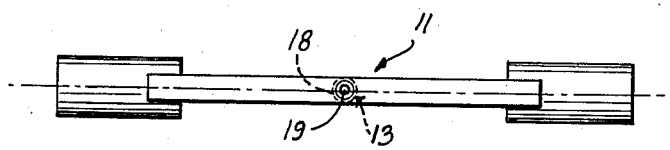
Figure 4 is an enlarged plan view showing the back head.
Figure 5:
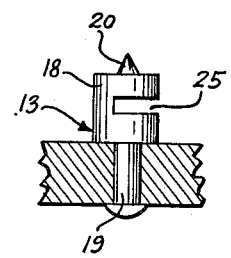
Figure 5 is a partial view, partly in section showing the manner in which one of the blocks is mounted.
Figure 6:
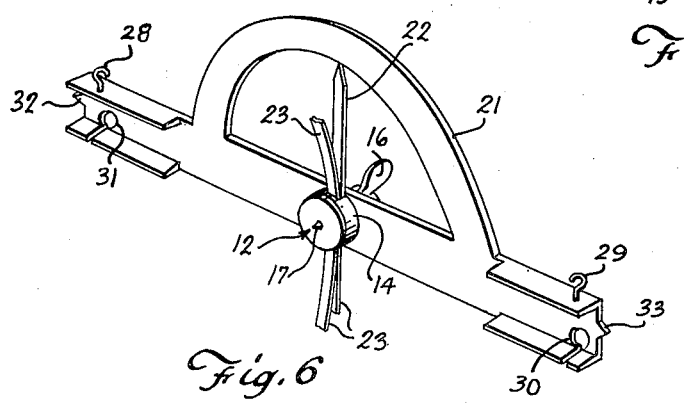
Figure 6 is a rear perspective view showing the front head with its block mounted therein.

As illustrated in Figures 2, 4, and 6, the elongated heads 10 and 11 are trough-like in cross section adjacent their ends. The front head 10 has a protractor 21 formed integral therewith that measures angles of inclination from the reference axis thereof.

The invention also includes a flexible metallic tape 23. In the embodiment shown one of the free ends of the tape 23 is fixedly secured in a through slot as at 24 with the longitudinal axis of the secured portion of the tape in parallel relation to the longitudinal axis of the pointer 22. The slot in which the free end of the tape 23 is fixedly secured extends through the block 12 from one side to the other and is large enough to frictionally receive a cross section of the other free end of the tape 23.

The block 13 which is pivotally mounted in the back head 11 is slotted as at 25 to freely receive a cross section of the tape 23.

The invention also includes chains 26 and 27 for mounting the heads 10 and 11 on the exterior wall of the pipe with their principal axes in parallel spaced apart relation to each other and with the pivotal axis of each of the blocks 12 and 13 aligned with each other. The chains 26 and 27 are spring-like in character at least for a portion of their length as indicated at 26a and 27a so that they will pull tightly around pipes of various diameters. They permanently attach to one side of the free ends of the front head 10 as at 28 and 29 respectively, and detachably attach to the opposite side of the free ends of the front head 10 as at 30 and 31.

The pipe scribing device of the present invention is very simple to use. In use, the outer wall of the pipe to be marked is scribed with a line extending parallel to its longitudinal axis. This can readily be effected with a length of angle iron and a soap stone in a well-known manner. A second line is then drawn, also in parallel spaced apart relation to the longitudinal axis of the pipe but diametrically opposed to the first-mentioned line. The location of this second line can be determined by measuring half way around the pipe with a piece of string or with the tape 23 of the pipe scriber. A punch mark is then made on one of the above-mentioned lines in a desired location. The wing nut 16 is removed from the threaded stem 15 to release the block 12 from the head 10. The point 17 is placed in the punch hole and tape 23 is extended around the pipe and the free end thereof is caused to pass through the through slot formed in the block. The steps thus far mount the block 12 on the pipe. The next step in the use of the scriber is to place the head 10 over the threaded stem 15 of the block 12 and align its reference axis with the line marked on the pipe. The head 10 preferably has points 32 and 33 extending therefrom to demark the reference axis for alignment with the line marked on the pipe. The straps 26 and 27 are then fixed around the pipe to retain the head 10 in this aligned position.

The next step is to align the pointer with the 90 degree angle on the protractor 21 and pull the tape 23 taut. A second punch mark is made on the second-mentioned line described on the pipe at the intersection therewith of the centre line of the tape 23. The chains 26 and 27 are then lifted up to permit the free ends of the elongated head 11 to be placed thereunder in the manner shown in Figure 2. The point 20 on the block 13, of course, enters into the punch mark formed at the above-mentioned intersection of the centre of the tape 23 with the second-mentioned line formed on the pipe and the tape 23 is caused to pass through the solt 25 in the block 11.

After the above steps have been effected the scriber is mounted for use. In use, the pointer 23 is turned to any angle that it is desired to make a cut and the wing nut 16 is tightened against the head 10 to rigidly secure the block 12 with respect to the rigidly mounted head 10. The tape 23 is then pulled taut. It will assume an angle that corresponds with the angle of the pointer 22 as the slots in the pivotally mounted head 13 align with the tape 23. In order to mark the pipe a scriber is merely drawn around the pipe along the edge of the tape.

What I claim as my invention is:

1. A device for scribing pipes comprising, two heads, each of said heads having a reference axis, two blocks, one of said blocks being pivotally mounted in one of said heads with its pivotal axis at right angles to the reference axis thereof, the other of said blocks being pivotally mounted in the other of said heads with its pivotal axis at right angles to the reference axis thereof, a flexible tape, one free end of said flexible tape being rigidly secured to one of said blocks, the other one of said blocks being formed with a slot through which said tape can pass, said block to which said tape is rigidly secured being slotted to receive the other free end of said tape and being designed to frictionally retain it therein, means for mounting said heads on the exterior wall of a pipe with their reference axes in parallel spaced apart relation to each other and with the pivotal axis of each of said blocks aligned with each other.

2. A device for scribing pipes comprising, two elongated heads, the longitudinal axis of each of said heads being adapted to form a reference axis, said heads being channel-like in cross section at least adjacent each of their extremities, two blocks, one of said blocks being pivotally mounted in one of said heads with its pivotal axis at right angles to the reference axis thereof, the other of said blocks being pivotally mounted in the other of said heads with its pivotal axis at right angles to the reference axis thereof, a flexible tape, one free end of said flexible tape being rigidly secured to the one of said pivotally mounted blocks, the other one of said blocks being formed with a slot through which said tape can pass, said block to which said tape is rigidly secured being slotted to frictionally receive the other end of said tape, means for mounting said heads on the exterior wall of a pipe with their reference axes in parallel spaced apart relation to each other and with the pivotal axes of said blocks aligned with each other.

3. A device for scribing pipes comprising, two heads, each of said heads having a reference axis, two blocks, one of said blocks being pivotally mounted in one of said heads with its pivotal axis at right angles to the reference axis thereof, the other of said blocks being pivotally mounted in the other of said heads with its pivotal axis at right angles to the reference axis thereof, a flexible tape, one free end of said flexible tape being rigidly secured to one of said blocks, the other one of said blocks being formed with a slot through which said tape can pass, said block to which said tape is rigidly secured being slotted to receive the other free end of said tape and being designed to frictionally retain it therein, a protractor rigidly mounted on one of said heads and designed to measure angles of inclination from the reference axis thereof, means for mounting said heads on the exterior wall of a pipe with their reference axes in parallel spaced apart relation to each other and with the pivotal axes of said blocks aligned with each other.

4. A device for scribing pipes comprising, two heads, each of said heads having a reference axis, two blocks, one of said blocks being pivotally mounted in one of said heads with its pivotal axis at right angles to the reference axis thereof, the other of said blocks being pivotally mounted in the other of said heads with its pivotal axis at right angles to the reference axis thereof, a flexible metallic tape, one free end of said flexible tape being rigidly secured to one of said blocks, the other one of said blocks being formed with a slot through which a cross section of said tape can freely pass, said block to which said tape is rigidly secured being slotted to receive the other free end of said tape in cross section and being designed to frictionally retain it therein, a protractor rigidly mounted on one of said heads and designed to measure angles of inclination from the reference axis thereof, a pointer carried by the one of said two blocks that is pivotally mounted in the head to which said protractor is rigidly mounted, said pointer being adapted to co-act with said protractor, the longitudinal axis of the free end of said tape that is rigidly secured to said head being in parallel relation to said pointer, means for clamping said block carrying said pointer in fixed relation to the head in which it is mounted.

5. A device for scribing pipes comprising, two elongated heads, the longitudinal axis of each of said heads being adapted to form a reference axis, said heads being channel-like in cross section at least adjacent each of their extremities, two blocks, each of said blocks having a body portion and a stem, each of said heads being bored on its reference axis to pivotally receive the stem of one of said blocks whereby one of said blocks can be pivotally mounted in one of said heads with its pivotal axis at right angles to the reference axis thereof, and the other of said blocks can be pivotally mounted in the other of said heads with its pivotal axis at right angles to the reference axis thereof, a flexible metallic tape, a protractor carried by one of said heads adapted to measure the angle of inclination from the reference axis thereof, a pointer carried by the block mounted in said head to which said protractor is mounted and designed to co-act with said protractor, one free end of said flexible tape being rigidly secured to said latter mentioned block with the longitudinal axis of said rigidly secured end portion in parallel relation to the longitudinal axis of said pointer, the other one of said blocks being formed with a slot through which a cross section of said tape can pass, said block to which said tape is rigidly secured being formed with a through slot to frictionally receive the other end of said tape in cross section, and means for mounting said heads on the exterior wall of a pipe with their reference axes in parallel spaced apart relation to each other and with their pivotal axes aligned with each other.

6. A device for scribing pipes as claimed in claim 5 in which the free end of the stem of said block that is mounted in the head which carries said protractor is threaded, said threaded free end being adapted to project through said head and said device having a nut designed to threadedly engage on the threaded free end of said stem and tighten against said body.

JOSEPH A. McLEAN.

No references cited